(12) United States Patent
Sheriff et al.

(10) Patent No.: US 10,317,271 B2
(45) Date of Patent: Jun. 11, 2019

(54) INTEGRATED PART ANALYSIS (IPA) WEIGHT CALCULATION PROCESS

(71) Applicant: THE BOEING COMPANY, Chicago, IL (US)

(72) Inventors: Scott Preston Sheriff, Bothell, WA (US); Ryan Patrick Frans, Everett, WA (US); James Joseph Campbell, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 650 days.

(21) Appl. No.: 14/689,213

(22) Filed: Apr. 17, 2015

(65) Prior Publication Data

US 2016/0305816 A1    Oct. 20, 2016

(51) Int. Cl.
*G01G 23/00* (2006.01)
*G01G 19/07* (2006.01)

(52) U.S. Cl.
CPC .................... *G01G 19/07* (2013.01)

(58) Field of Classification Search
CPC ............. G06Q 10/06; G06Q 10/063; G06F 17/30424; G06F 17/30554; G06F 17/30477
USPC ........................................................ 707/624
See application file for complete search history.

(56) References Cited

U.S. PATENT DOCUMENTS

| | | | |
|---|---|---|---|
| 6,477,518 B1 | 11/2002 | Li et al. | |
| 2005/0055181 A1* | 3/2005 | Verdura | G06F 17/50 703/1 |
| 2006/0167760 A1* | 7/2006 | Chakraborty | G06Q 30/02 705/26.61 |
| 2009/0222911 A1* | 9/2009 | Chen | G05B 19/409 726/19 |
| 2013/0191078 A1* | 7/2013 | Batra | G06F 17/5095 703/1 |
| 2013/0270162 A1* | 10/2013 | Ardes | B01D 29/21 210/130 |
| 2014/0000584 A1* | 1/2014 | Raucher | F16B 11/006 126/696 |
| 2016/0162343 A1* | 6/2016 | Fitzpatrick | G06F 9/444 719/318 |
| 2017/0177419 A1* | 6/2017 | Fitzpatrick | G06F 9/444 |

* cited by examiner

*Primary Examiner* — John E Breene
*Assistant Examiner* — Jeffrey P Aiello
(74) *Attorney, Agent, or Firm* — Patterson + Sheridan, LLP

(57) ABSTRACT

Embodiments of the present disclosure relate to processes and software used to standardize the calculation of the weight and CG of a product. The processes and software integrate data from multiple sources and confirm the accuracy of the data. The software program standardizes the calculation of weight and CG by using a central calculation worksheet accessible to all users tasked with determining the weight and balance of a product. The software includes functionality for viewing Bill of Material (BOM) and 3D images, for operating a calculation worksheet, for storing and filtering data, and for reporting data.

20 Claims, 11 Drawing Sheets

INTEGRATED PART ANALYSIS (IPA) WEIGHT CALCULATION PROCESS

BACKGROUND

Field of the Disclosure

Embodiments of the present disclosure generally relate to the field of computer software. More specifically, embodiments provided herein relate to a system and method for the calculation of the weight and center of gravity (CG) of a product.

Description of the Related Art

Calculation of weight and CG, for large, complex products which include numerous subcomponents is an extremely labor-intensive process. Generally, multiple personnel are given a respective subsection of the complex product, and tasked with determining all relevant calculations for their respective portion. This often results in duplicative work for overlapping parts, or for duplicative parts present in each subsection, because each person is working in isolation on their respective part. Moreover, such an approach may lead to inconsistencies, as different personnel may make different estimates or assumptions, when necessary. Due to the nature of this process, these calculations are rarely—if ever—completed due to budgetary constraints, and for the completed portions, accuracy consistently suffers.

Therefore, there is a need for a method and for software for improving the calculation of weight and CG for a product.

SUMMARY

Embodiments of the present disclosure relate to processes and software used to standardize the calculation of the weight and CG of a product. The processes and software integrate data from multiple sources and confirm the accuracy of the data. The software program standardizes the calculation of weight and CG by using a central calculation worksheet accessible to all users tasked with determining the weight and balance of a product. The software includes functionality for viewing bill of materials (BOM) and 3D images, for operating a calculation worksheet, for storing and filtering data, and for reporting data.

In one embodiment, a computer-implemented method comprises receiving a query for a subcomponent of a complex component; in response to receiving the query, retrieving, by operation of a computer processor, physical specifications for the subcomponent; presenting to a user, via a graphical user interface, a flag indicating a BOM issue exists for the subcomponent; providing guidance to the user to complete a weight or balance calculation; receiving user input, the user input including weight and balance data; and transferring, by operation of the computer processor, the weight or balance data to the database if the user has access privileges for accessing the database.

In another embodiment, a system comprises an integrated tool analysis server, the integrated tool analysis server comprising: a central processing unit; and a memory operatively coupled to the central processing unit and storing an integrated part analysis tool thereon, the integrated part analysis tool adapted to: receive a query for a subcomponent of a complex component; in response to receiving the query, retrieve, by operation of a computer processor, physical specifications for the subcomponent; present to a user, via a graphical user interface, a flag indicating a BOM issue exists for the subcomponent; provide guidance to the user to complete a weight or balance calculation; receive user input, the user input including weight and balance data; and transfer, by operation of the computer processor, the weight or balance data to the database if the user has access privileges for accessing the database.

In another embodiment, a computer program product for determining weight or center of gravity of a component comprises: a computer-readable storage medium having computer-readable program code embodied therewith, the computer-readable program code executable by one or more computer processors to: receive a query for a subcomponent of a complex component; in response to receiving the query, retrieve, by operation of a computer processor, physical specifications for the subcomponent; present to a user, via a graphical user interface, a flag indicating a BOM issue exists for the subcomponent; provide guidance to the user to complete a weight or balance calculation; receive user input, the user input including weight and balance data; and transfer, by operation of the computer processor, the weight or balance data to the database if the user has access privileges for accessing the database.

DETAILED DESCRIPTION

Embodiments of the present disclosure relate to processes and software used to standardize the calculation of the weight and CG of a product. The processes and software integrate data from multiple sources and confirm the accuracy of the data. The software program standardizes the calculation of weight and CG by using a central calculation worksheet accessible to all users tasked with determining the weight and balance of a product. The software includes functionality for viewing bill of material and 3D images, for operating a calculation worksheet, for storing and filtering data, and for reporting data.

Figure 1:
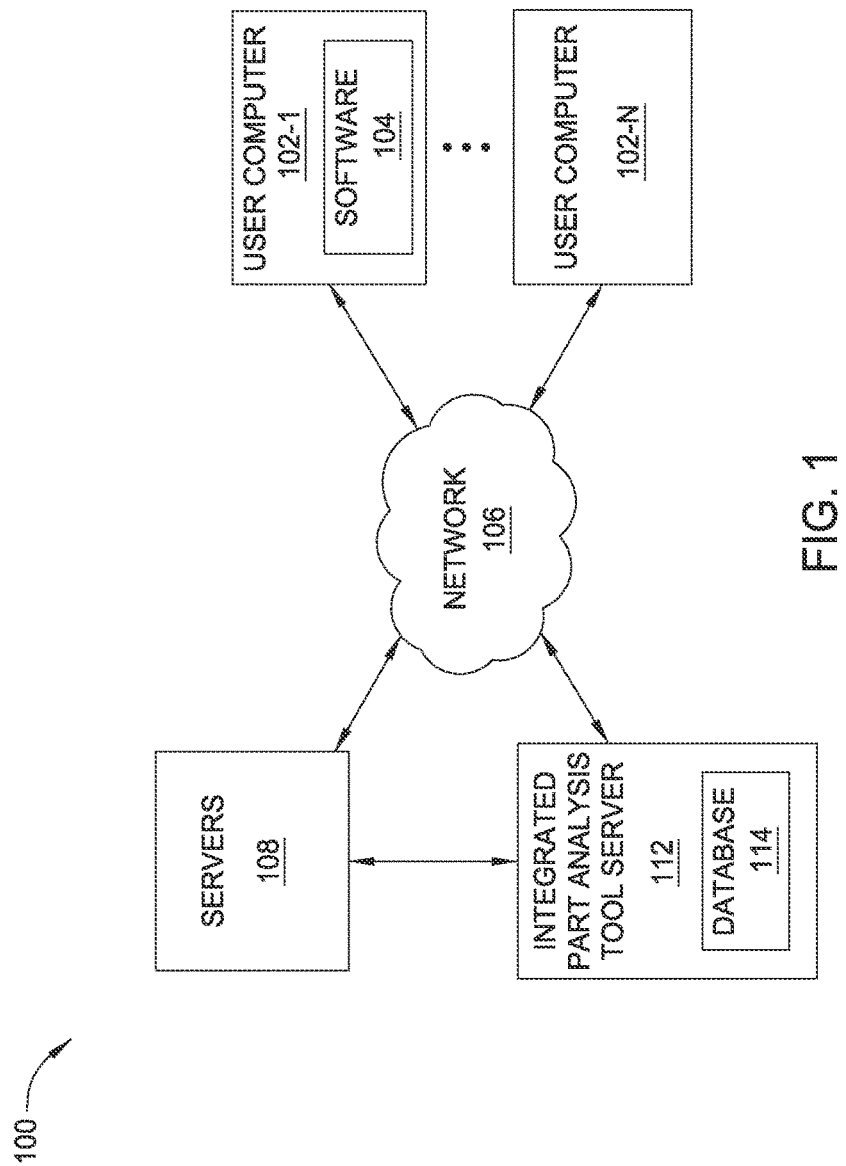
FIG. 1 illustrates a computer system configured to facilitate weight and balance and CG calculations using an integrated part analysis tool, according to one embodiment described herein.

FIG. 1 illustrates a computer system 100 configured to facilitate weight and balance and CG calculations using an integrated part analysis tool, according to one embodiment described herein. As shown, the computer system 100 may include a plurality of servers 108, an integrated part analysis tool server 112, and one or more user computers 102-1 through 102-n (two of which are shown for clarity), each connected to a communications network 106 (for example, the Internet or an internal network). The integrated part analysis tool server 112 may include a database 114 therein for storing data, or alternatively, the integrated part analysis tool server 112 may communicate with the database 114 via a local connection (for example, a Storage Area Network (SAN) or Network Attached Storage (NAS)) or over the Internet. The servers 108 are configured to either directly access data included in the database 114 or to interface with a database manager that is configured to manage data included within the database 114. It is contemplated that the database 114 may also be connected to other databases (not shown), which may provide data to the database 114.

Each user computer 102-1 through 102-n may include conventional components of a computing device, for example, a processor, system memory, a hard disk drive, a battery, input devices such as a mouse and a keyboard, and/or output devices such as a monitor or graphical user interface, and/or a combination input/output device such as a touch screen which not only receives input but also displays output. Each server 108 and the integrated part analysis tool server 112 may include a processor and a system memory (not shown), and may be configured to manage content stored in database 114 using, for example, relational database software and/or a file system. The servers 108 may be programmed to communicate with one another, user computers 102, and the integrated part analysis tool server 112 using a network protocol such as, for example, the TCP/IP protocol. The integrated part analysis tool server 112 may communicate directly with the user computers 102 through the communications network 106. The user computers 102 are programmed to execute software 104, such as engineering programs, computer Aided Design (CAD) programs, database and/or spreadsheet programs, and other software applications, and also programmed to access data through the network 106.

In the embodiments described below, users are respectively operating the user computers 102 that are connected to the servers 108 and the integrated part analysis tool server 112 over the communications network 106. In one example, the user's computer 102 may access data stored on the database 114, the servers 108, or the integrated part analysis tool server 112 via the communications network 106. Thus, all users with sufficient privileges at user computers 102-1 through 102-n have access to data on the database 114. Data stored on the database 114 may be accessed, retrieved, changed, deleted, or modified through the user computers 102-1 to 102-n via the network 106, the servers 108, and/or the integrated part analysis tool server 112. In one embodiment, it is contemplated that the database 114 may be connected to the servers 108.

It is noted that the user computer 102 may be a personal computer, laptop mobile computing device, smart phone, and/or other computing devices having components suitable for communicating with the communications network 106. The user computers 102-1 through 102-n may also execute other software applications other than those described herein.

Figure 2:
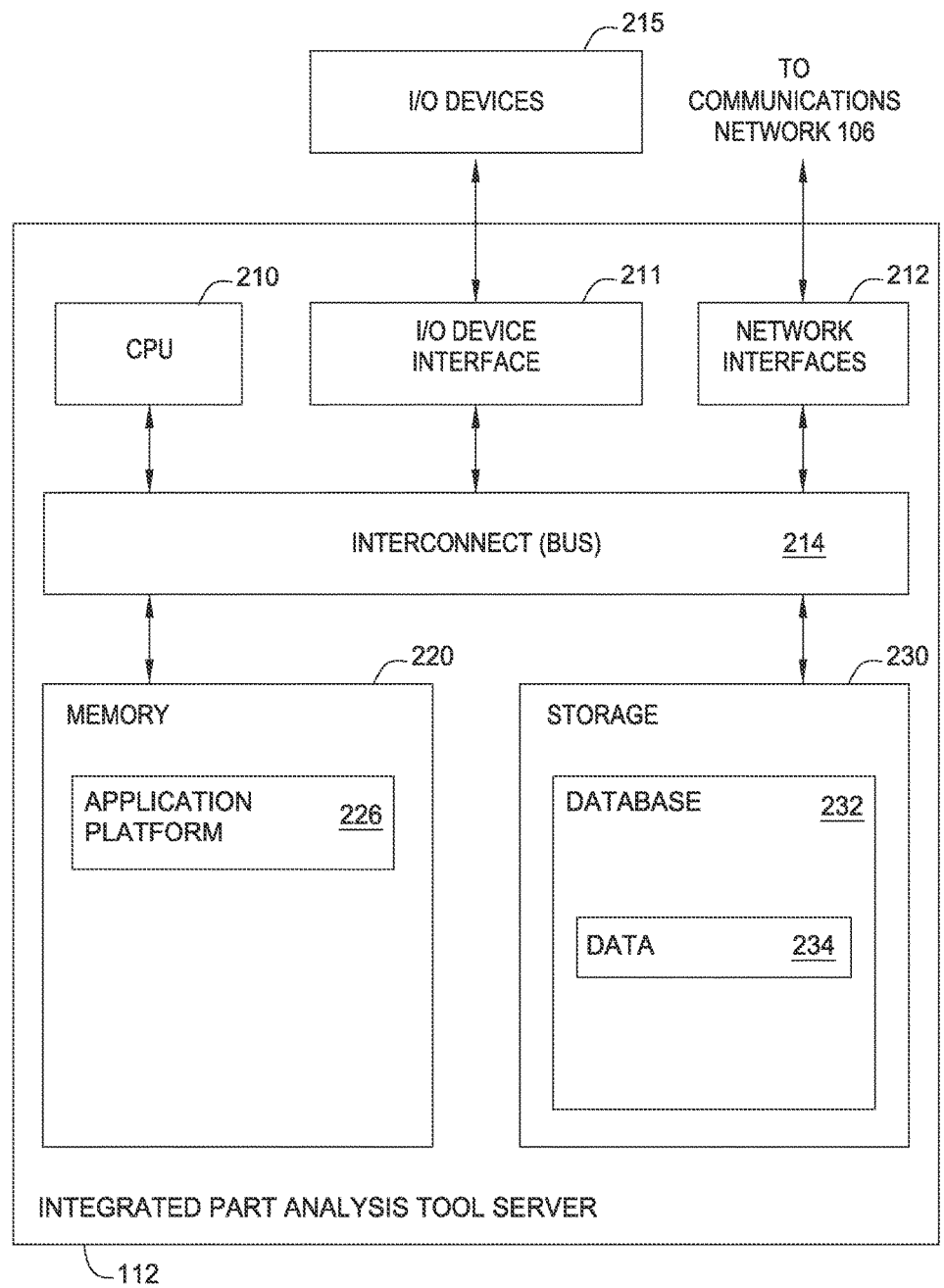
FIG. 2 illustrates a more detailed view of an integrated part analysis tool server of FIG. 1, according to one embodiment described herein.

FIG. 2 illustrates a more detailed view of an integrated part analysis tool server 112 of FIG. 1, according to one embodiment described herein. The integrated part analysis tool server 112 includes, without limitation, a central processing unit (CPU) 210, a network interface 212, memory 220, and storage 230 communicating via an interconnect 214. The integrated part analysis tool server 112 may also include I/O device interfaces 211 connecting I/O devices 215 (for example, keyboard, video, mouse, audio, touch screen, etc.). The integrated part analysis tool server 112 may further include the network interface 212 configured to transmit data via the communications network 106.

The CPU 210 retrieves and executes programming instructions stored in the memory 220 and generally controls and coordinates operations of other system components. Similarly, the CPU 210 stores and retrieves application data residing in the memory 220. The CPU 210 is representative of a single CPU, multiple CPU's, a single CPU having multiple processing cores, and the like. The interconnect 214 is used to transmit programming instructions and application data between the CPU 210, I/O device interfaces 211, storage 230, network interfaces 212, and memory 220.

The memory 220 is representative of a random access memory and, in operation, stores software applications and data for use by the CPU 210. Although shown as a single unit, the storage 230 may be a combination of fixed and/or removable storage devices, such as fixed disk drives, floppy disk drives, hard disk drives, flash memory storage drives, tape drives, removable memory cards, CD-ROM, DVD-ROM, Blu-Ray, HD-DVD, optical storage, network attached storage (NAS), cloud storage, or a storage area-network (SAN) configured to store non-volatile data.

The memory 220 may store instructions and logic for executing an application platform 226. In one example, the application platform 226 may be an integrated part analysis tool configured to calculate the weight and balance of a product—among other functionalities—as described in more detail below. The storage 230 includes a database 232 for storing data 234. The database 232 may be configured to store data 234, such as content associated with the application platform 226. The database 232 may be any type of storage device. Network computers are another type of computer system that can be used in conjunction with the disclosures provided herein. Network computers do not usually include a hard disk or other mass storage, and the executable programs are loaded from a network connection into the memory 220 for execution by the CPU 210.

Figure 3:
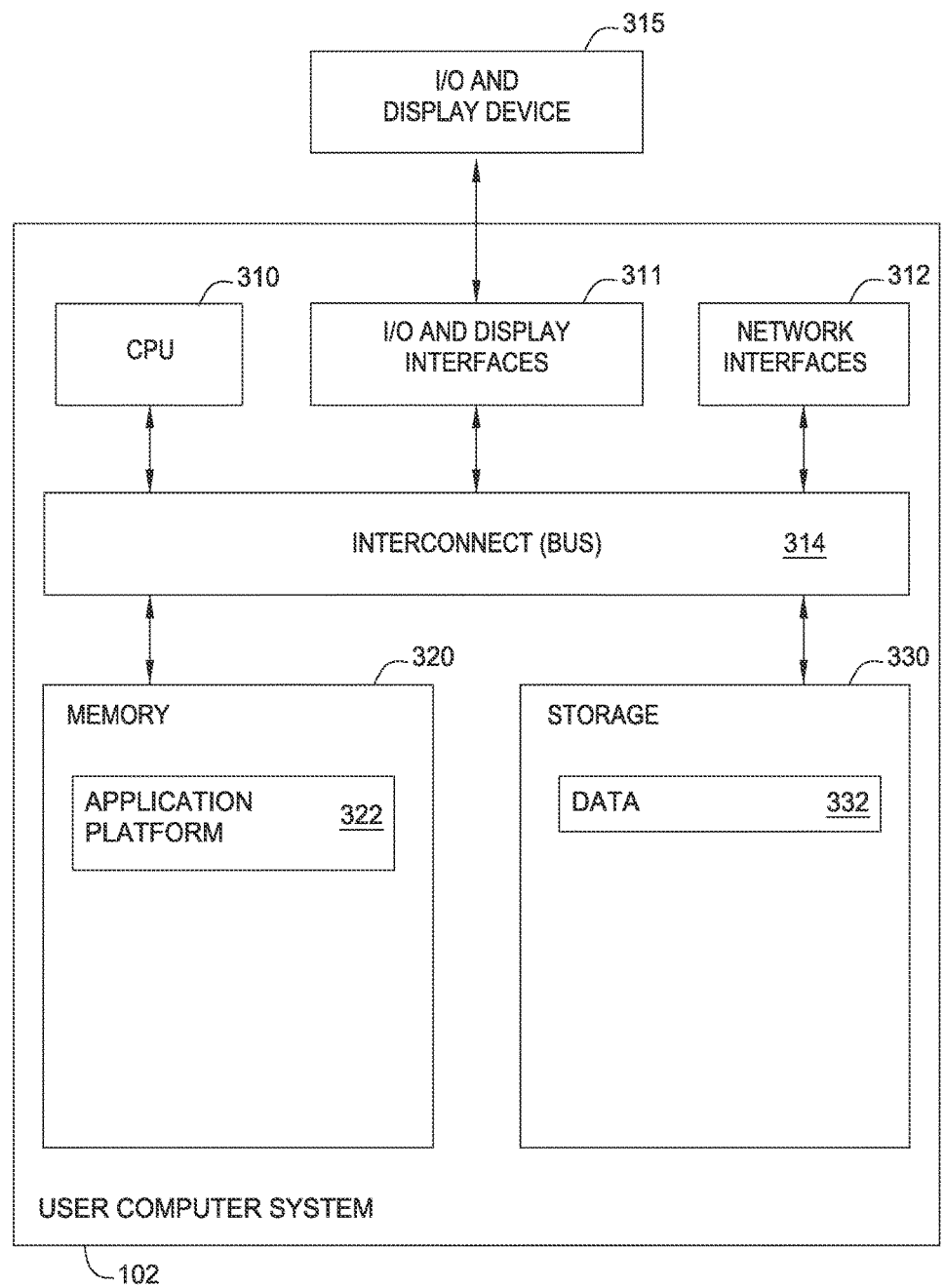
FIG. 3 illustrates a user computer for implementing software programs for weight and balance and CG calculations, according to one embodiment described herein.

FIG. 3 illustrates a user computer 102 for implementing software programs for weight and balance calculations, such as an integrated part analysis tool, according to one embodiment described herein. The user computer 102 may include, without limitation, a central processing unit (CPU) 310, a network interface 312, an interconnect 314, a memory 320, and a storage 330. The user computer 102 may also include an I/O device interface 311 connecting I/O devices 315 (for example, keyboard, display, touch screen, and mouse devices) to the user computer 102.

Like CPU 210, CPU 310 is representative of a single CPU, multiple CPU's, a single CPU having multiple processing cores, etc., and the memory 320 is generally included to be representative of a random access memory. The interconnect 314 may be used to transmit programming instructions and application data between the CPU 310, the I/O device interfaces 311, the storage 330, the network interface 312, and the memory 320. The network interface 312 may be configured to transmit data via the communications network 106, for example, to transmit content to/from the integrated part analysis tool server 112. Storage 330, such as a hard disk drive or solid-state storage drive (SSD), may store non-volatile data. The storage 330 may include data 332, such as data related to manufacturing components, including subcomponents of fully assembled products. Illustratively, the memory 320 may include an application interface 322, which itself may display the data 332, for example, in a spreadsheet or database format.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present disclosure also includes apparatus for performing the operations described herein. This apparatus may be specially constructed for the required purposes, or it may comprise a general purpose computer selectively activated or reconfigured by a computer program stored in the computer. Such a computer program may be stored in a computer readable storage medium, such as, but not limited to, read-only memories (ROMs), random access memories (RAMs), EPROMs, EEPROMs, flash memory, magnetic or optical cards, any type of disk including floppy disks, optical disks, CD-ROMs, and magnetic-optical disks, or any type of media suitable for storing electronic instructions, and each coupled to a computer system interconnect.

The processes and displays presented herein are not inherently related to any particular computer or other apparatus. Various general purpose systems may be used with programs in accordance with the teachings herein, or it may prove convenient to construct a more specialized apparatus to perform the required method operations. The required structure for a variety of these systems will appear from the description above. In addition, the present examples are not described with reference to any particular programming language, and various examples may thus be implemented using a variety of programming languages.

Figure 4:
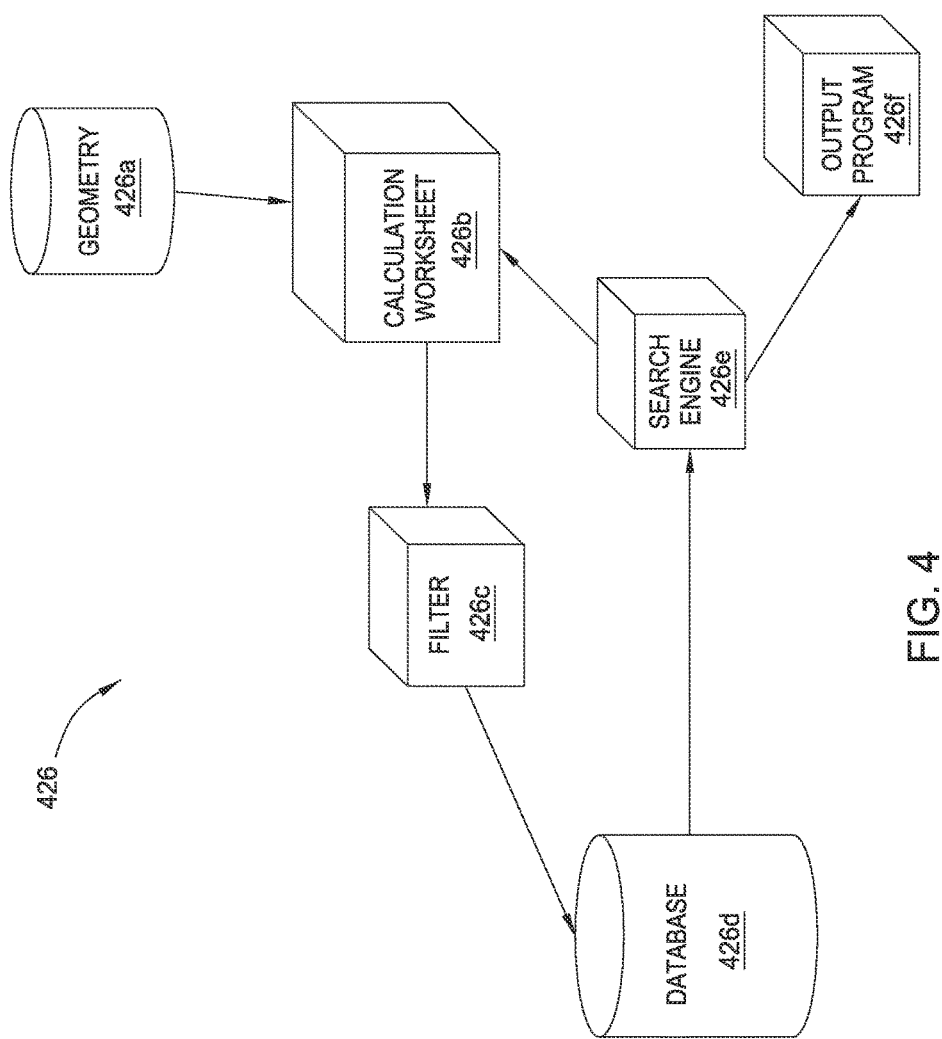
FIG. 4 illustrates an integrated part analysis tool, according to one embodiment described herein.

FIG. 4 illustrates an integrated part analysis tool 426, according to one embodiment described herein. The integrated part analysis tool 426 may be the application platform 226 illustrated in FIG. 2. The integrated part analysis tool 426 may be one or more software programs, such as a software suite, which includes the functionality for a geometry program 426a, such as a three-dimensional (3D) computer aided design (CAD) program; a calculation worksheet program 426b, for example a spreadsheet program such as Microsoft® Excel®; a filtering program 426c, a database 426d, a search engine 426e, and an output program 426f. While FIG. 4 illustrates the integrated part analysis tool as a plurality of separate software or program components, it is contemplated that the functionality of one or more components may be combined into a software program with multi-functional capabilities.

The geometry program 426a may be a drawing tool, such as a 3D CAD program which can provide physical properties of a component. Examples of physical properties may include length, width, area, volume, thickness, and the like. The geometry program 426a may export user-selected values, such as physical properties, to the calculation worksheet program 426b. The calculation worksheet program 426b may facilitate the calculation of data related to a component, based upon data received from the geometry program 426a. For example, using the volume of a component received from the geometry program 426a, and the density of the construction material, the weight of the component may be estimated. The calculation worksheet program 426b may also account for manufacturing changes to components, including holes formed for fasteners, application of paints and sealants, application of welding material, and installation of smaller subcomponents during assembly which may change component dimensions.

The filter program 426c may receive data from the calculation worksheet program 426b. The filter program 426c performs data validation and verification on data calculated by the calculation worksheet program 426b, prior to providing the data to the database 426d. For example, the filter program may confirm if received data is a valid data type, and whether the data is received from a user with sufficient privileges to change the data within or to save the data to the database 426d. The database 426d may be a database program such as Oracle® Database or Microsoft® Access®, which is adapted to store physical specifications of a component as well as other relevant data needed for weight and balance calculations. Physical specifications for a component may include scale-derived (e.g., measured or actual) weights and balances, calculated weights and balances, physical dimensions, construction materials, and the like. The database 426d may store data related to component weights (such as those determined by the calculation worksheet program 426b), parent-child relationships amongst components or products, data related to physical properties of parts (such as data from the geometry program 426a), and material properties data. In one example, database 426d may be equated to database 114 shown in FIG. 1.

The integrated part analysis tool 426 also includes the search engine 426e. The search engine 426e may include a user interface to facilitate accessing, viewing, and searching of data stored in the database 426d and for interacting with the calculation worksheet program 426b and/or the database 426d. The output program 426f may be utilized to output search results from the search engine 426e in various formats, including PDF, Excel® worksheets, Word® documents, or other formats.

In one example, each of the geometry program 426a, the calculation worksheet program 426b, the search engine 426e and the output program 426f may operate on a user computer 102 (shown in FIG. 1), and a user may interact therewith through a graphical user interface. In such an embodiment, the user may modify data within the database 426d through filter program 426c. In another embodiment, the geometry program 426a, the calculation worksheet program 426b, the search engine 426e, and the output program 426f may operate on a plurality of user computers 102-1 through 102-n. In such an embodiment, multiple users may interact with database 426d through the filter program 426c via each of their respective user computers 102-1 through 102-n. Such a configuration allows all users with sufficient privileges to access, view, and/or change data within the database 426d. This allows for a central repository of weight and balance and CG information for a variety of parts available to all users, which substantially eliminates duplicate calculations performed by users which would otherwise be unaware that the desired data exists.

Figure 5:
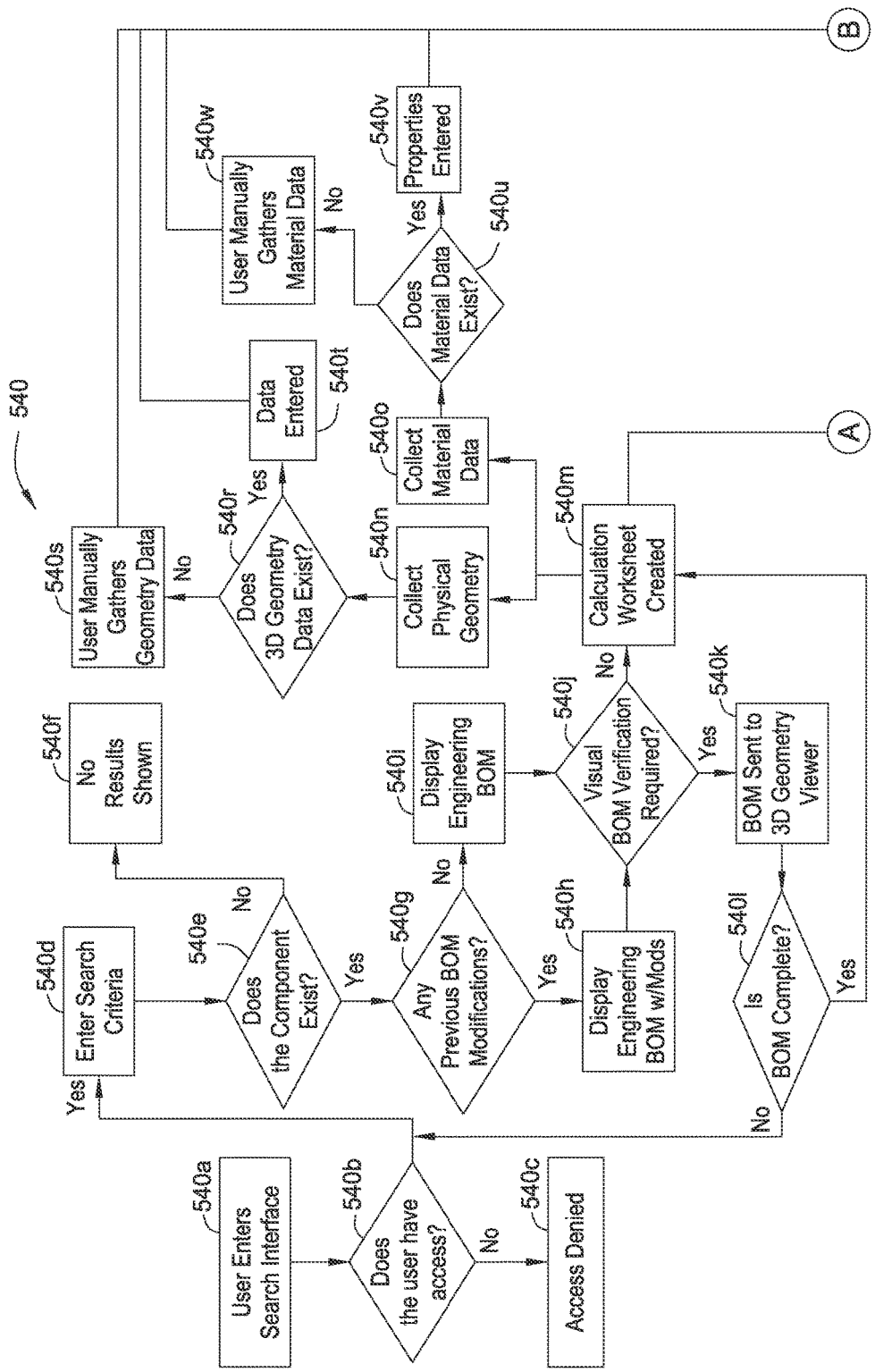
FIG. 5 illustrates a flow diagram for calculating weight of a product using the integrated part analysis tool of FIG. 4, according to one embodiment described herein.
Figure 5:
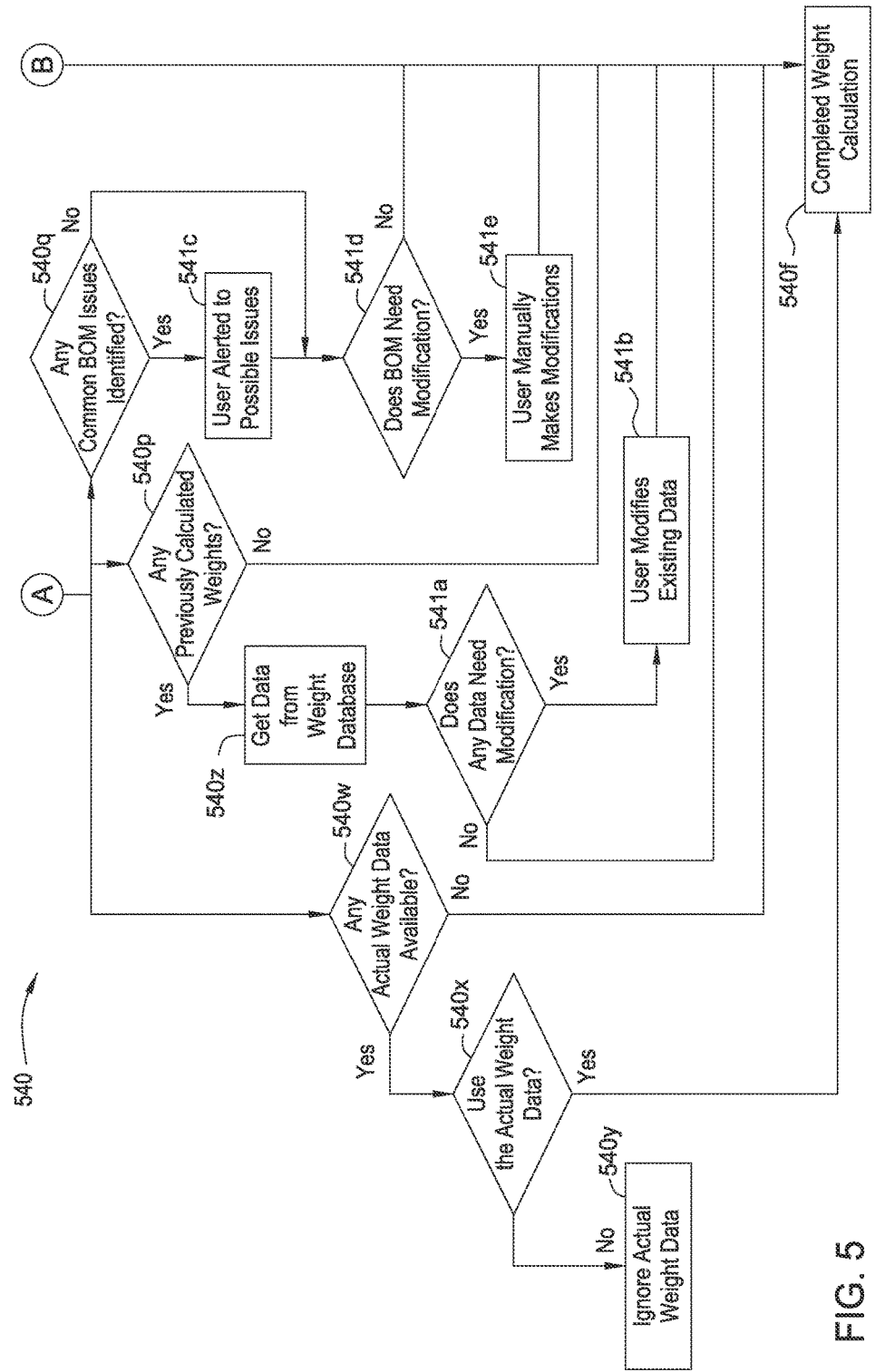

FIG. 5 illustrates a flow diagram 540 for calculating weight of a product using the integrated part analysis tool 426 of FIG. 4, according to one embodiment described herein. Flow diagram 540 begins at operation 540a, in which a user enters a search interface, such as the search engine 426e, via a user computer 102. In operation 540b, a determination is made whether the user has sufficient privileges to access the search interface. If the user does not have sufficient privileges, flow diagram 540 proceeds to operation 540c, and access is denied. If the user does have sufficient privileges, flow diagram 540 proceeds to operation 540d. In operation 540d, a user enters search criteria, for example a subcomponent of a complex component, through the search interface. The query is received by the integrated parts analysis tool 426, and the integrated parts analysis tool 426 accesses the database 426d. A determination is made in operation 540e whether the searched-for component exists, and if the component does not exist, flow diagram 540 proceeds to operation 540f, and no results are shown.

If the searched component does exist in the database 426d, flow diagram 540 proceeds to operation 540g in which a determination is made as to whether there has been any previous bill of material (BOM) modifications for the searched component. If modifications have been made to the BOM for the component, the BOM and the corresponding modification are presented in operation 540h. If no modifications have been made, the BOM is presented in operation 540i. Additionally or alternatively in operation 540i, in response to receiving the query of operation 540d, the integrated parts analysis tool 426 retrieves weight and/or balance data for the queried subcomponent from the database 426. Both operation 540h and 540i proceed to operation 540j, where a determination of whether a visual BOM verification is required. If a visual BOM verification is required, the BOM is sent to the geometry program 426a in operation 540k, and confirmation of completion of the BOM is made in operation 540l via visual inspection by a user. If the BOM is incomplete, flow diagram 540 returns to operation 540d.

If the BOM is complete upon visual inspection by a user, or if visual inspection of the BOM is not required in operation 540j, flow diagram 540 proceeds to operation 540m where a calculation worksheet is created by the worksheet program 426b. The calculation worksheet may present to a user, via a graphical user interface, weight or balance data for the queried subcomponent, including the weight and balance data previously retrieved. Additionally, in operation 540m, a user may be notified that previously retrieved weight or balance data is incomplete. Notification may include, for example, incomplete or blank entries in the calculation spreadsheet. Additionally or alternatively, notification may include prompting a user with a flag, for example, on a graphical user interface.

Flow diagram 540 may then proceed to any or all of operations 540n, 540o, 540p, 540q, and 540w. In operation 540n, physical geometry data may be collected from the geometry program 426a or from the database 426d, and provided to the calculation worksheet program 426b. When collecting the physical geometry data, flow diagram 540 may proceed to operation 540r where a determination is made as to whether 3D geometry already exists, for example, in geometry program 426a. If the 3D geometry data does not exist, flow diagram proceeds to operation 540s, and a user manually gathers the 3D geometry data. If the 3D geometry data already exists, the data is imported into the calculation worksheet program 426b in operation 540t. The collected data may be transferred to and/or stored in a database 426, if the user has sufficient privileges for accessing the database 426d.

Returning to operation 540o, material data for the component parts is also collected for entry into the calculation worksheet program 426b. In operation 540u, a determination is made as to whether the material data exists, for example, in the database 426d or in the geometry program 426a. If the material data exists, it is entered into the calculation worksheet program 426b in operation 540v. If the material data does not exist, the material data is manually entered into the calculation worksheet program 426b by a user in operation 540w. The collected data may be transferred to and/or stored in a database 426d, if the user has sufficient privileges for accessing the database 426d.

After creation of the calculation worksheet in the calculation worksheet program 426b in operation 540m, flow diagram 540 may also proceed to operation 540w where a determination is made as to whether measured weight data for a component is available. For example, manufacturers may provide weights for purchased materials, or some components may be measured on a scale, and the values may be stored in the database 426d. If measured weight data exists, the actual weight data may be compared to a calculated weight data and a difference therebetween may be determined in operation 540x. Also in operation 540x, a determination may be made by a user as to whether the measured weight data is to be used for future operations. If the measured weight data is to be used in the calculation worksheet, the weight calculation is complete with respect to the searched component. If the measured weight data is not to be used, the flow diagram may proceed to operation 540y, and the measured weight data may be ignored.

After creation of the calculation worksheet in operation 540m, the integrated part analysis tool may perform a determination in operation 540p of whether any previously-calculated part weights exist in the database 426d for the relevant part or any subcomponents. In one example, operation 540p may be performed by the search engine 426e. If previously-calculated part weights exist, the data is retrieved by the worksheet program 426b in operation 540z, and in operation 541a, a determination is made, by a user or by the integrated part analysis tool 426, as to whether the data requires any modification. This determination may be made by a user, who may optionally be prompted or flagged by the integrated part analysis tool 426 that modification may be required, for example, due to part upgrades, changes, recalculations, etc. If the user and/or the integrated parts analysis tool 426 determine that the existing data requires modification, the data is modified by a user in operation 541b. The modified data may be saved to the database 426d if the user has sufficient privileges to modify the database 426d.

Additionally, after creation of the calculation worksheet in operation 540m, the integrated analysis tool determines if any common BOM issues exist in operation 540q. Examples of common BOM issues may include: (1) "As-Required" parts, or parts in which a quantity is not explicitly defined; (2) "Make-From" parts, or parts which are altered or modified during the installation process; (3) duplicate entries; (4) assemblies known to have only a single component (e.g., erroneously indicated as an "assembly" of multiple subcomponents, when no further subcomponents exist); (5) parts requiring fluid; and (6) parts marked as requiring special attention by previous users.

One example of an "As-Required" part is a shim. The exact number of shims may not be precisely determined until assembly. An example of a "Make-From" part is a part which may need to be machined or trimmed to complete assembly, such as a forged or cast part. Often, a raw forging may need to be machined or trimmed prior to installation. However, the corresponding BOM may reflect the raw forging rather than the trimmed or machined forged part. Because the exact size/weight/balance of "As-Required" and "Make-From" parts is not known until assembly is complete, it is difficult to calculate the weight and balance of these components prior to assembly. Often, inexperienced users will have difficulty calculating or estimating weight and balance of "As-Required" and "Make-From" parts, or the inexperienced users will altogether miss that an issue exists with the calculations for "As-Required" and "Make-From" parts.

However, the integrated parts analysis tool 426 provides guidance to users for calculating weight and balance of "As-Required" and "Make-From" parts, as well as facilitates identification of "As-Required" and "Make-From" parts during calculation processes. In one example, an "As-Required" or "Make-From" part may be identified by the integrated parts analysis tool 426 during an operation by part number, part name, or by an indicator included on the BOM of the part. For example, by definition, an assembly has more than one children part, so if the BOM indicates that a part has zero child parts or one children part, the BOM is flagged as a potential issue, Other items may be flagged based on the description of the part, such as forgings and castings. For example, if the description of the part contains "Forg", parts including "Forge" or "Forging" within the description may be flagged. Similarly, parts including the term "cast" may be flagged to identify castings such as cast parts. Optionally, the integrated parts analysis tool 426 may ignore the term "castellated", which does not indicate a BOM issue, while still flagging "cast" parts. Moreover, BOM issues may be identified by part numbers. For instance, part numbers that contain certain strings (e.g., "BACS40") may indicate a part with a potential BOM issue, such as a shim. Determination of BOM issues is facilitated by previous user experience, and may be refined during operation through changes to program settings and/or program code.

Once BOM issues have been identified, the integrated parts analysis tool 426 provides guidance on estimating and calculating weight/balance for the "As-Required" or "Make-From". The guidance may have be input by more experienced users as the more experienced users encountered "As-Required" or "Make-From" parts during previously-performed calculations. The guidance may include suggestions or considerations for calculations, or may include calculations or actual weights form similar parts.

In one example, the integrated parts analysis tool 426 provides notifications when a user encounters as-required and make-from parts. The integrated parts analysis tool 426 may also default to providing suggested calculation methods. If a more experienced user has previously performed a calculation on a part having an identified BOM issue, the details and comments of the experienced user's work will be shown to the new user. For example, the first time a part having a BOM issue is encountered, a flag will be shown to a user that a potential BOM issue exists, such as forged part that may need modification before calculation. Thus, a user is clearly able to identify which parts require attention. As inexperienced users subsequently interact with the integrated parts analysis tool 426, the integrated parts analysis tool 426 is able to flag BOM issues and offer guidance or suggestions to improve calculation accuracy. Therefore, even though a user may be inexperienced with respect to a particular BOM issue, the user is still able to accurately calculate a weight and balance for a part with a BOM issue due to support provided by the integrated parts analysis tool 426.

If a BOM issue exists, the user is alerted to the issue through a graphical user interface in operation 541c by the integrated parts analysis tool. Upon receiving an alert of the issue, a user makes a determination in operation 541d as to whether the BOM needs modification. If the BOM needs modification, flow diagram 540 moves to operation 541e, and the user manually makes a modification to the BOM, which is then saved to the database 426d. The conclusion of flow diagram 540 occurs with operation 541f, resulting in a completed weight calculation, corresponding to the searched-for component, which is input into the calculation worksheet program 426b, passed through the filter 426c for validation, and saved to the database 426d.

Flow diagram 540 provides a method for one or more users to access and update a database of component values, such as weight and/or CG, using an integrated part analysis tool 426. The integrated part analysis tool integrates multiple software components for accurate weight and balance of a manufactured component and for the subcomponents of the manufactured components. The integrated part analysis tool simplifies weight and balance and CG calculations by providing information from a central database to a plurality of users, so that all users have access to, and can manipulate, the information. Additionally, the integrated parts analysis tool 426 facilitates identification of parent/child part relationships of components or subcomponents, thereby reducing the time required to estimate child part weights/CG by using previously-prepared parent parts as a starting point. The integrated parts analysis tool 426 is particularly useful for large, complex products, such as aircraft, which contain hundreds to thousands of subcomponents, many of which will go through several revisions (e.g., parent/child relationships) during a product lifetime.

In another embodiment, it is contemplated that search criteria entered in operation 540d may be a major model number, such as model 100, or a minor model number, e.g., a variant of the major model number such as 100-$x$ or 100-$y$. In such an example, data retrieved by the integrated parts analysis tool 426 may include completed weight and/or balance measurements for parts that overlap with other major or minor model numbers. The overlapping parts may be identified by the integrated parts analysis tool 426 due to shared part numbers. Thus, the returned results may include completed calculations for existing parts, and may identify the new parts requiring weight/balance calculations, thereby reducing the workload of a user by preventing duplicate calculations. Moreover, the integrated parts analysis tool 426 may identify a percentage of new parts and/or a percentage of existing parts on a new aircraft model.

Figure 6:
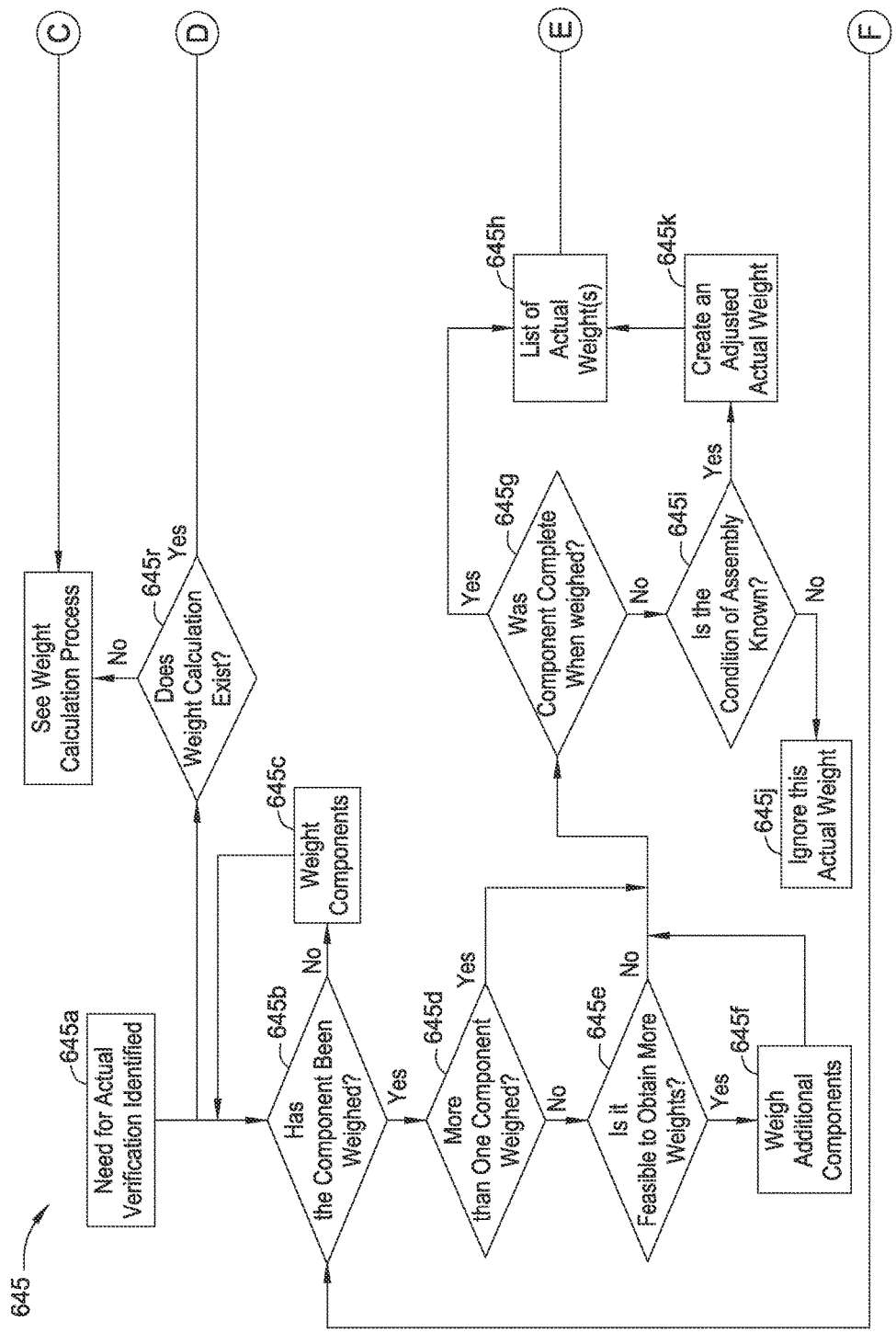
FIG. 6 illustrates a flow diagram for verifying the actual weight of a product with a weight calculation, according to one embodiment described herein.
Figure 6:
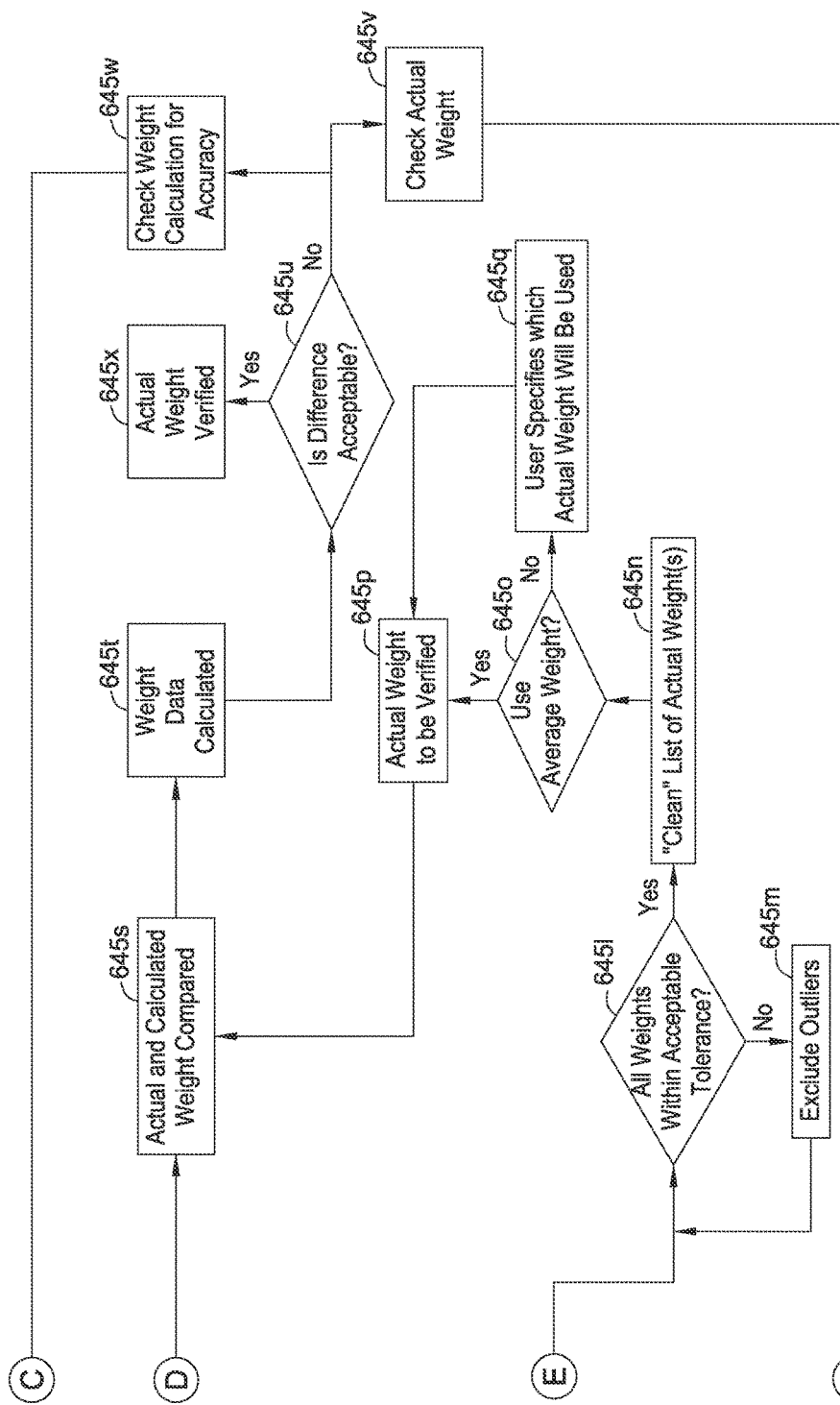

FIG. 6 illustrates a flow diagram 645 for verifying the actual (e.g., scale-derived or measured) weight of a product with a weight calculation, according to one embodiment described herein. Such a process ensures that the actual parts are within design specifications. Flow diagram 645 begins at operation 645a, in which a need for verifying the actual weight of a product, part, or component is identified. Subsequently, in operation 645b, a determination is made as to whether the component has been weighed, for example, using a scale. If the component has not been weighed, flow diagram proceeds to operation 645c, and the component is weighed. Flow diagram 645 then returns to operation 645b, and the determination as to whether the component has been weighed is made again.

If, in operation 645b, the component has been weighed, flow diagram 645 proceeds to operation 645d and a determination is made by the integrated part analysis tool 426 whether more than one component has been weighed, for example, whether multiple subcomponents were weighed as a single, assembled component. If not, flow diagram 645 proceeds to operation 645e, and a determination is made by a user whether it is feasible to obtain more weights, for example, the weights of additional subcomponents. If it is feasible to do so, additional weights are obtained in operation 645f. If it is not feasible or if it is undesirable, flow diagram 645 proceeds to operation 645g. Similarly, returning to operation 645d, if the determination made in operation 645d is affirmative, flow diagram 645 proceeds to operation 645g.

In operation 645g, a determination is made whether the component was complete (e.g., fully assembled from subcomponents) when weighed. This determination may be made by a user or by the integrated part analysis tool 426. If so, the actual weights of the subcomponents are retrieved by the integrated part analysis tool 426 from the database 426d and input into the calculation worksheet program 426b in list format in operation 645h. The list format may include the part number and description of the component being analyzed, the measured weight of the component, and optionally any other data pertinent to the weighing process of this component, such as the name of a user who weighed the component, a date/time stamp of when the component was weighed, and a description of the condition of assembly at the time of weighing. If operation 645g results in a negative determination, flow diagram 645 proceeds to operation 645i and a determination of whether the condition (e.g., fully assembled or partially assembled) is known, is made by the user or by the integrated part analysis tool 426. If the condition is not known, flow diagram 645 proceeds to operation 645j, and the actual weight is ignored. If the condition is known, flow diagram 645 proceeds to operation 645k and an adjusted weight value is created in the calculation worksheet program 426b from data stored in the database 426d. In one example, the adjusted weight value may be a total weight of multiple subcomponents, calculated based upon the individual weights of the respective subcomponents. Subsequently, flow diagram 645 proceeds to operation 645h.

After generating a list of actual weights in operation 645h, flow diagram 645 proceeds to operation 645l, and a determination is made whether all weights in the list of actual weights are within an acceptable tolerance. Operation 645l may include an operation in which the integrated parts analysis tool 426 compares the actual weight of a component (found in the list of weights from operation 645h) to a weight specified to the component manufacturer (e.g., a design specification). The specified weight may be stored in the database 426d and retrievable by the integrated parts analysis tool for comparison purposes. If any of the weights are outside of acceptable tolerances, the components and/or weights out of tolerance are excluded in operation 645m, and then flow diagram returns to operation 645l.

If all weights are deemed within tolerance in operation 645l, flow diagram 645 proceeds to operation 645n, in which a "clean" list of actual weights is generated within the calculation worksheet program 426b. A "clean" list includes the weights of parts or components only for those within defined and acceptable tolerances. After generation of the "clean" list in operation 645n, a user makes a determination in operation 645o whether to average weight values of a part or component if the database 426d includes more than one weighed part of the same type. For example, if a lot of widgets includes 100 parts, more than one of the widgets within the lot may be weighed by quality control to determine that the widgets are within specification. In operation 645o, the user may optionally determine whether to average the weight of all measured widgets. If all weights are to be averaged, then flow diagram 645 proceeds to operation 645p, and the actual weight for use in the verification operation is defined as the average weight. If an average weight is not used, then flow diagram 645 proceeds to operation 645q, and user specifies which actual weight is to be used for comparison purposes. This user-selected weight is confirmed in operation 645p.

Returning to operation 645a, subsequent thereto, operation 645r may be performed. Operation 645r may be performed before, after, or contemporaneously with operation 645b. In operation 645r, the integrated part analysis tool 426 determines if a weight calculation exists for the relevant part or component. If not, flow diagram 540 (shown in FIG. 5) is performed. If a weight calculation already exists, flow diagram 645 proceeds to operation 645s. In operation 645s, the calculated weight of a part or component is compared to the actual (or measured) weight of the same part or component by the integrated part analysis tool 426. This comparison results in determination of the difference (e.g., the delta) therebetween in operation 645t. Subsequently, a determination is made in operation 645u whether the difference is within an acceptable limit. This determination may be performed by a user or by the integrated part analysis tool 426. If the difference is not acceptable, then flow diagram proceeds to operation 645u, in which the actual weight of the component is checked by returning to operation 645b. Additionally, flow diagram 645 proceeds to operation 645w in which the calculated weight of the component is checked using flow diagram 540. However, if the difference in operation 645w is acceptable, then flow diagram 645 proceeds to operation 645x, in which the integrated part analysis tool 426 confirms verification of the actual weight of the part.

In summary, flow diagram 645 provides a method of confirming that actual weights of components correspond to calculated weights, using an integrated part analysis tool 426. This ability allows estimators to refine estimating techniques to ensure accurate estimates based upon comparisons to actual components. Likewise, the comparison of actual weights to calculated weights may facilitate identification of actual weights which are outside a predetermined margin of error compared to the calculated weights, and thus, not in conformation with design specifications. Such a comparison may indicate an issue with a manufacturing process rather than an estimating process. Thus, flow diagram 645 may assist with indentifying manufacturing issues by bringing the issue to the attention of a user of the integrated part analysis tool 426.

Figure 7:
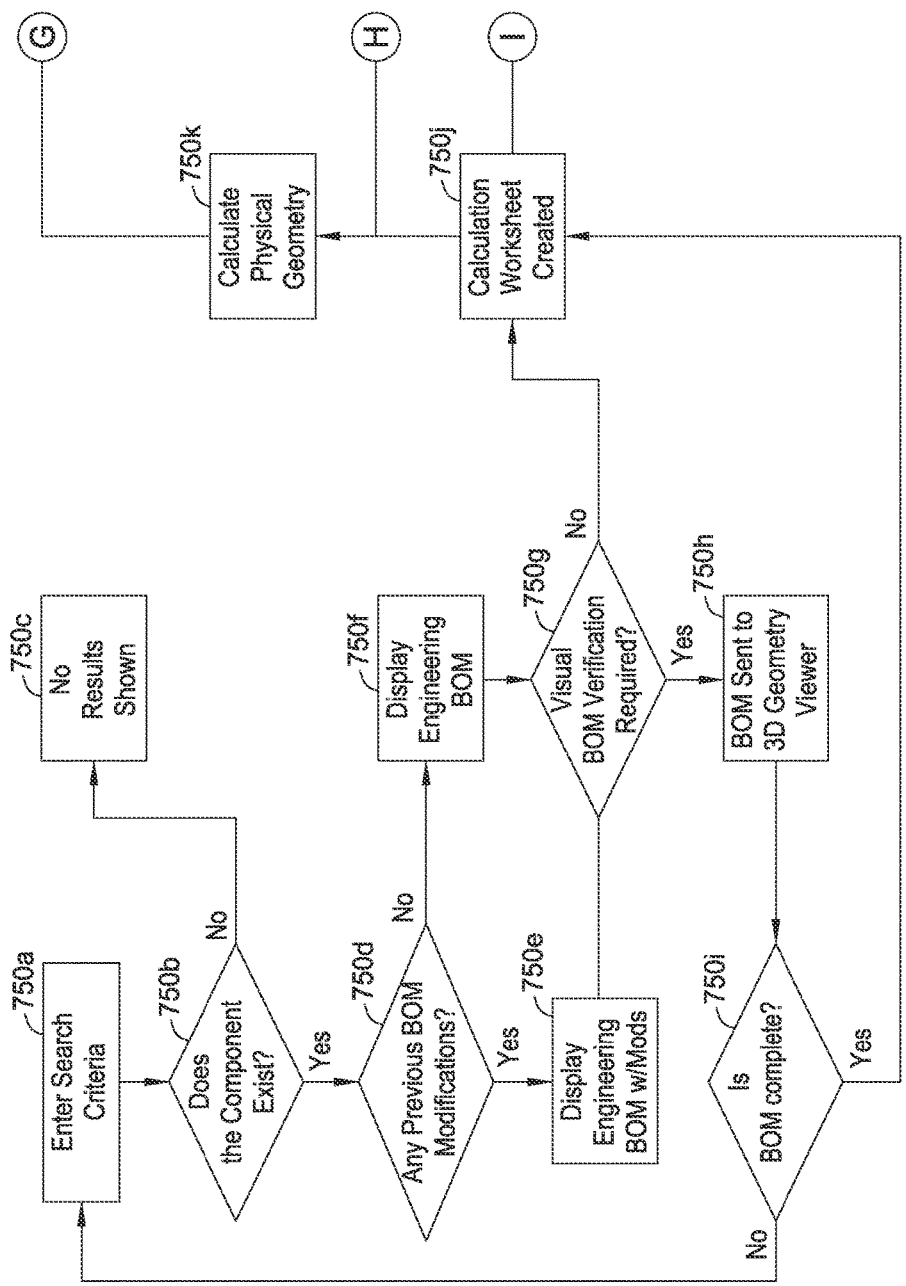
FIG. 7 illustrates a flow diagram for calculating buy weights of a material or component using the integrated part analysis tool of FIG. 4, according to one embodiment described herein.
Figure 7:
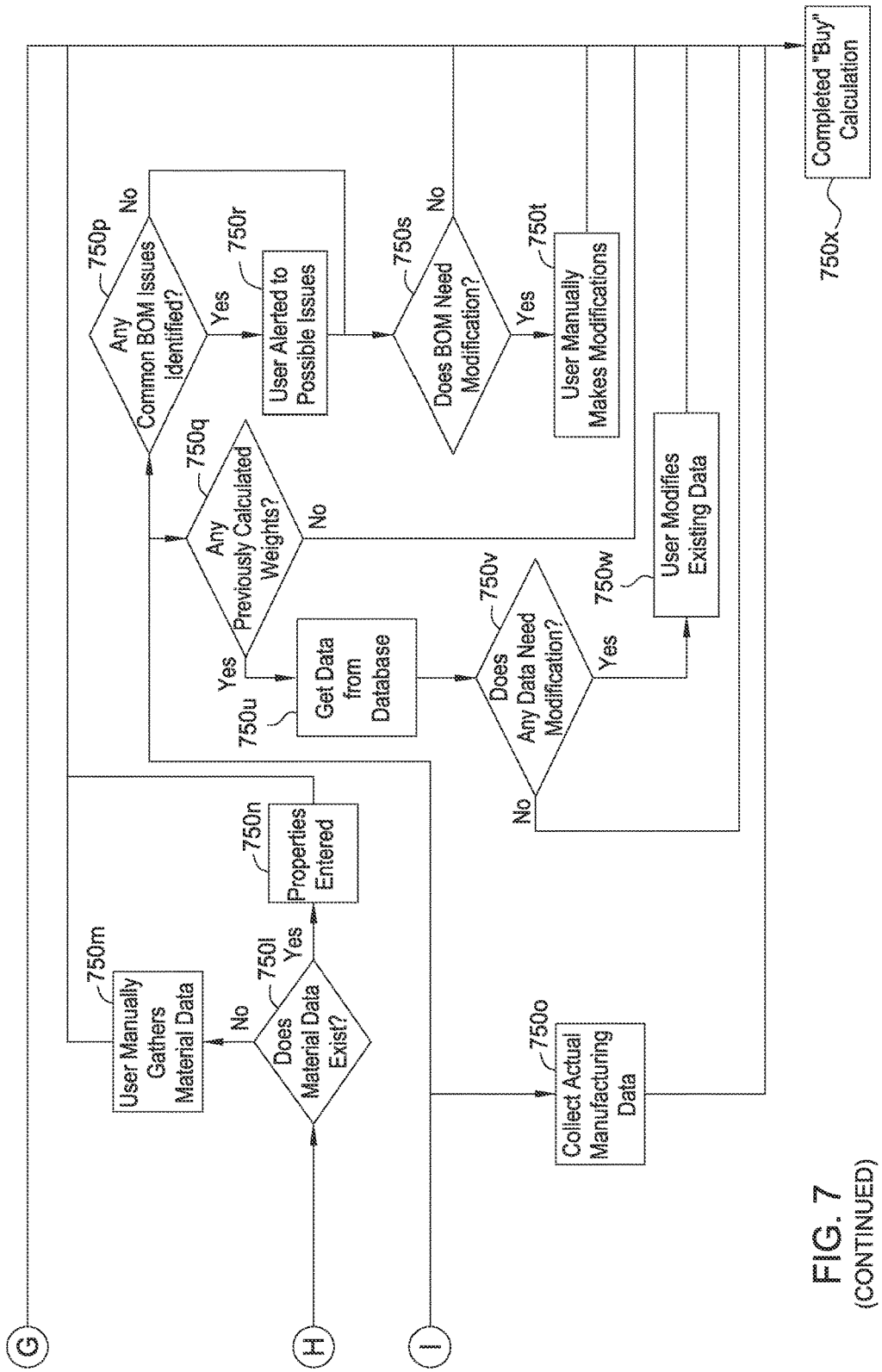

FIG. 7 illustrates a flow diagram 750 for calculating buy weights of a component using the integrated part analysis tool 426 of FIG. 4, according to one embodiment described herein. Flow diagram 750 facilitates identification of a quantity, type, and form of material to be purchased based upon factors such as component weight, customer demand of products containing the component, and/or market price of raw materials.

Flow diagram 750 begins at operation 750a, in which the user enters search criteria in the search engine 426e (shown in FIG. 4). If the user lacks access rights to the search engine 426e, the user may be prohibited from utilizing the search engine 426e. In response to the query of operation 750a, a determination is made in operation 750b by the integrated part analysis tool 426 whether the searched-for component exists. If the searched-for component does not have a corresponding entry in the database 426d, then a message is displayed to a user in operation 750c indicating that no results exist. If the searched-for component exists in the database 426d, the integrated part analysis tool 426 makes a determination in operation 750*d* whether any previous BOM modifications have been made in the database 426*d* with respect to the searched-for component. If so, the BOM is displayed with the corresponding modifications in operation 750*e*, otherwise, only the BOM is displayed in operation 750*f*.

After both operations 750*e* and 750*f*, flow diagram 750 proceeds to operation 750*g* in which a user makes a determination whether visual verification of a BOM is required. For example, a user may select to view a BOM in the geometry program 426*a* to confirm that the results of the search in operation 750*a* are correct. If the user wishes to view the BOM, the BOM is provided to the geometry program 426*a* in operation 750*h*, and the user makes the determination whether the BOM is complete in operation 750*i*. If the BOM is not complete, flow diagram 750 returns to operation 750*a*. If the BOM is deemed complete, flow diagram 750 proceeds to operation 750*j*. Returning to operation 750*g*, if visual verification is not required, flow diagram 750 may proceed directly to operation 750*j* from 750*g*.

In operation 750*j*, a calculation worksheet is created by the calculation worksheet program 426*b*. After creation of the calculation worksheet, the physical geometry of the searched-for part is calculated in operation 750*k*. The calculation of the physical geometry may be facilitated by dimensions received from the geometry program 426*a* or from the database 426*d*. Calculation of physical geometry assists in determining the total volume of material required to form the component, or other units of measurement necessary to determine an amount of material necessary to make the component. Additionally, after operation 750*j*, and either before, after, or contemporaneously with operation 750*k*, operation 750*l* is performed. In operation 750*l*, a determination is made to whether material data relating to the searched-for component exists. The material data may relate to the type of material used to form the searched-for component, for example, the type(s) of material used to form the component, amount of material used to form the component, form (e.g., shape) of the component, and market prices or market trends for the materials used to form the component. If the material data does not exist, the material data is entered manually in operation 750*m* by a user. If the material data exists in the database 426*d*, then the material data is imported into the calculation worksheet program 426*b* during operation 750*n*.

Additionally, after operation 750*j*, and either before, after, or contemporaneously with operations 750*k* and 750*l*, operation 750*o* is performed. In operation 750*o*, actual manufacturing data is collected and incorporated into the calculation worksheet. Actual manufacturing data includes the type, form, and amount of the material used to manufacture the component. Additionally, after operation 750*j*, operations 750*p* and 750*q* are performed. In operation 750*p*, the integrated part analysis tool may determine if any common BOM issues exist. Examples of common BOM issues are described above. If any issues exist, the user is alerted to the issue in operation 750*r* and then flow diagram 750 proceeds to operation 750*s*. If no issues are identified in operation 750*p*, flow diagram 750 proceeds directly to operation 750*s*. In operation 750*s*, a determination is made as to whether a BOM modification is desired. Examples of BOM modifications may include changes to component specifications, including size, shape, weight, material, model or part number, and the like. The determination of whether a BOM modification is desired may be made by a user. If a modification is desired, the user manually makes the modification in operation 750*t* by inputting the modification into the calculation worksheet.

In operation 750*q*, a determination is made by the integrated part analysis tool 426 whether the database 426*d* includes any previous calculated weights for the searched-for component. Calculated weights may have been calculated using flow diagram 540, as described above. If the database 426*d* includes the previously-calculated weight, the previously-calculated weight is retrieved from the database 426*d* in operation 750*u* and input into the calculation spreadsheet program 426*b*. Subsequently, in operation 750*v*, a determination is made by the user whether to modify any of the previously-calculated weight data imported from the database 426*d*. If the user desires to modify the data, the data is modified in operation 750*w* by the user.

Operation 750*x* is the final operation of flow diagram 750. In operation 750*x*, the integrated parts analysis tool 426 completes a buy or purchase calculation using the data of the calculation worksheet. The buy calculation indicates an amount of material to be purchased based upon physical attributes of a respective component, and optionally, may take into account market prices or other external factors. For example, if the market price is currently below the average market price, the integrated parts analysis tool 426 may return a buy amount greater than the present need in order to take advantage of the unusually low market price, thus mitigating future price increases.

Figure 8:
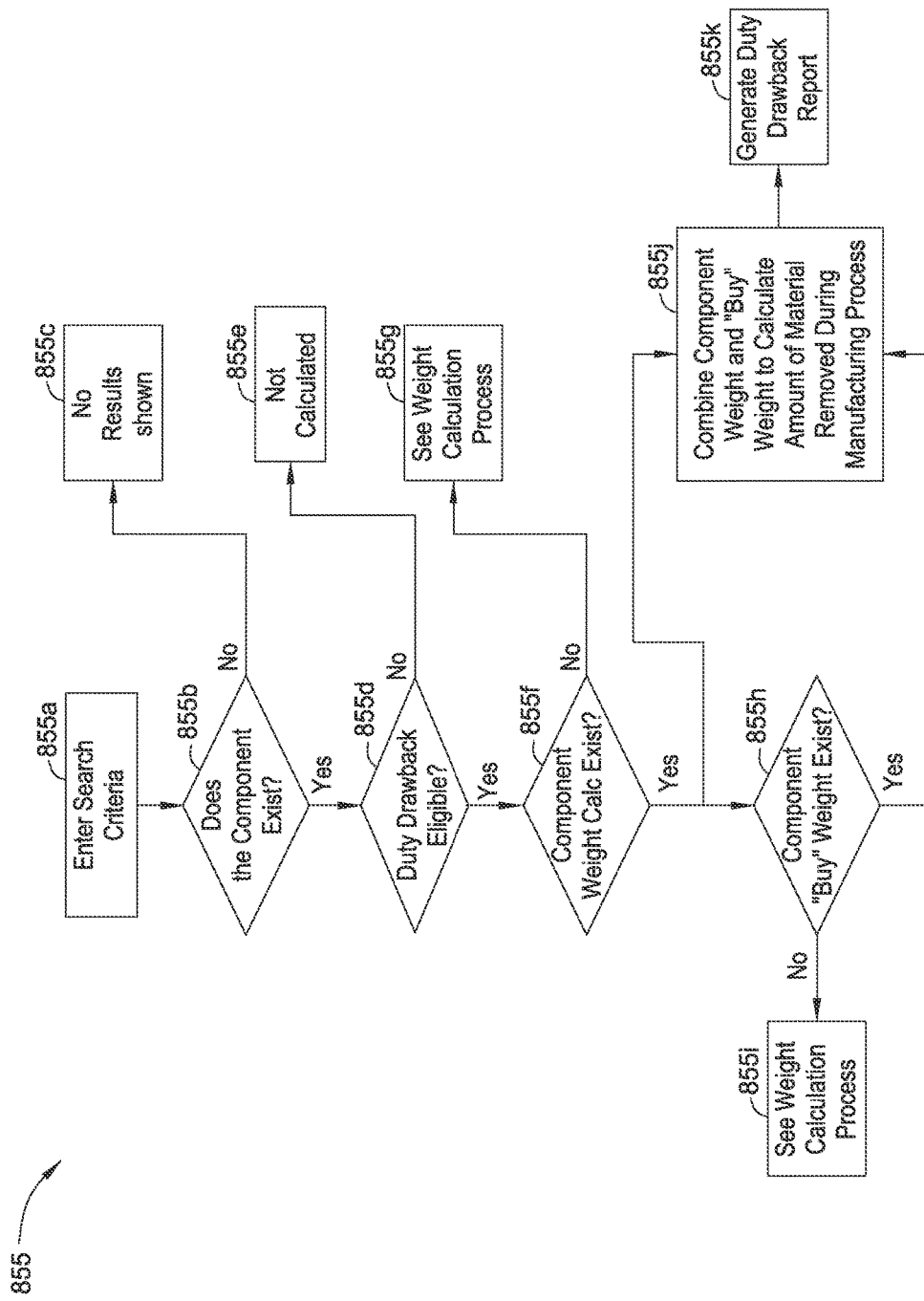
FIG. 8 illustrates a flow diagram for calculating duty drawback weights using the integrated part analysis tool of FIG. 4, according to one embodiment described herein.

FIG. 8 illustrates a flow diagram 855 for calculating duty drawback weights using the integrated part analysis tool 426 of FIG. 4, according to one embodiment described herein. Drawback is the refund of certain duties, internal revenue taxes and certain fees collected upon the importation of goods. In some circumstances, refunds are permitted upon the exportation or destruction of goods. The integrated part analysis tool 426 facilitates the calculation of drawback amounts.

Flow diagram 855 begins at operation 855*a* in which a user enters search criteria into the search engine 426*e* (shown in FIG. 4). If the user lacks access rights to the search engine 426*e*, the user may be prohibited from accessing the search engine 426*e*. In operation 855*b*, the integrated part analysis tool 426 determines if the searched-for component exists in the database 426*d*. If the component does not exist in the database 426*d*, no results are shown and a message indicating that no results exist is displayed to a user through a graphical user interface in operation 855*c*. If the component exists, the integrated part analysis tool 426 makes a determination in operation 855*d* whether the searched-for component is eligible for duty drawback. A duty drawback determination may include, for example, consideration of whether raw materials were imported, whether the searched-for component has been exported, or a determination of the difference between weight of the raw material and the finished component. The database 426*d* may include entries to facilitate one or more of these determinations.

If the component is ineligible for duty drawback, a drawback is not calculated and a message indicating the same may be displayed to a user in operation 855*e* via a graphical user interface. If the component is eligible for duty drawback, the integrated part analysis tool 426 proceeds to operation 855*f* and determines if component weight calculation exists in the calculation spreadsheet or in the database 426*d*. If a component weight calculation does not exist, the integrated part analysis tool proceeds to operation 855*g* and utilizes flow diagram 540 to determine a component weight.

If the component weight calculation already exists, then the integrated part analysis tool 426 proceeds to operation 855*h* and makes a determination of whether a buy weight exists for a component.

If a buy weight does not exist, the integrated part analysis tool 426 calculates a buy weight in operation 855*i* using flow diagram 750. Subsequently, in operation 855*j*, the buy weight is compared to the component weight to determine the amount of material removed and/or lost during processing, which is the amount of material eligible for drawback. In operation 855*k*, a duty drawback report is generated for the user. The duty drawback report indicates the amount of material eligible for duty drawback, and further, may indicate the amount of the duty drawback based upon data stored in the database 426*d*, such as duty fees paid per unit weight of raw material. Thus, flow diagram 855 simplifies the calculations of duty drawback weights, and may bring duty drawback values to a user's attention which may have otherwise gone unnoticed.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" or "the disclosure" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Embodiment of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure.

It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the terms "product", "part" or "component may be used interchangeably, and it is to be understood that each of these terms has an equivalent meaning unless the specification explicitly states otherwise in a given context.

In sum, the disclosed methods, software, and systems, include a database in a part analysis integrated tool which collects and integrates data into a single location. A user may interact with the data through an interface of the part analysis integrated tool, such as a search engine, to query for parts based upon any number of criteria, including major model number, minor model number, line number, part number, and the like. A user may select a searched-for part, and data related to the searched for part is provided to a calculation worksheet of the integrated part analysis tool from the database of the integrated part analysis tool. The calculation worksheet guides the user through a logical process to make sure weight calculation and CG calculations are complete and consistent. During the calculation process, the user is aided by a multiple process checks to help ensure accuracy by analyzing the data and alerting the user to common trouble areas. When the calculation is complete, the data is sent back to the database of the integrated part analysis tool for later use and for access by all other privileged users. The integrated part analysis tool may also include a reporting interface to facilitate a user in generating a report based upon calculated data or other data stored in the database.

The integrated part analysis tool also facilities derivative weight/CG estimates from a baseline estimate. For example, later models in a model line may use existing calculations stored in the database as a starting point for determining weight and CG, thus greatly expediting the calculations of the newer model. Additionally, the integrated part analysis tool allows a user to determine a weight or cost savings by swapping subcomponents of a larger complex component, and facilitates the user's determination of whether swap would be appropriate. Moreover, due to the overlapping nature of many subcomponents of different models of larger complex products, the integrated analysis tool eliminates the performance of calculations for redundant subcomponents, thereby improving overall efficiency. To facilitate such efficiency, the integrated parts analysis tool may provide a common parts list, for which calculations have already been performed, from which a user may select one or more desired components when performing weight and CG calculations. Also, the integrated parts analysis tool facilitates a comparison estimated weight versus calculated weight versus actual weight, which assists an estimator in refining his or her estimates, and also facilitates identification of issues with manufactured components which may be out of specification.

The integrated part analysis tool uses data pulled from internal or external sources such as servers or databases, as well data entered manually by a user, thus maximizing data collection. The integrated part analysis tool also identifies, via the above flow diagrams, which parts and which data should be manually calculated by a user to ensure accuracy of weight and CG calculations. In contrast, in previous approaches, the compilation of a calculation worksheet is a tedious, manual process, which often results in inaccuracies and which lacks any data integrity confirmation. Often, in previous approaches, a calculation worksheet is pieced together from calculations of multiple personnel, and therefore can be incomplete or inconsistent. Moreover, in previous approaches, the confirmation of data accuracy is performed manually, and therefore is time intensive, and is also subject to the experience and/or training of the user performing the check. Additionally, in previous approaches, updating of the database is manual process, further increasing labor requirements. However, the embodiments disclosed herein overcome these shortcomings of previous approaches.

While the foregoing is directed to embodiments of the present disclosure, other and further embodiments of the disclosure may be devised without departing from the basic scope thereof, and the scope thereof is determined by the claims that follow.

What is claimed is:
1. A computer-implemented method, comprising:
   receiving a query for a subcomponent of a complex component;

determining, by operation of a computer processor, that the subcomponent is one of: a make-from part and an as-required part;
in response to receiving the query, retrieving, by operation of the computer processor using a search engine, physical specifications for the subcomponent;
presenting to a user, via a first graphical user interface, a flag indicating a Bill of Materials (BOM) issue exists for the subcomponent, the flag indicating that the subcomponent is one of: a make-from part and an as-required part;
providing guidance to the user to complete at least one of a weight or balance calculation relating to the subcomponent;
receiving user input, the user input including at least one of a calculated weight and balance data;
validating the calculated weight or balance data using a filter program, the validation comprising:
  determining that that the calculated weight or balance data is a valid data type; and
  identifying database access privileges for the user and determining that the user has sufficient database access privileges to save data to a database;
transferring, by operation of the computer processor and based on validating the calculated weight or balance data, including determining that the user has sufficient database access privileges to save data to the database, the calculated weight or balance data to the database;
computing an error value by comparing the calculated weight or balance data with measured weight or balance data relating to the subcomponent; and
identifying an issue with a manufacturing process, for correction, based on determining that the error value falls outside a pre-determined margin of error, and in response providing an indication of the issue with the manufacturing process.

2. The method of claim 1, wherein the subcomponent is a make-from part.

3. The method of claim 1, wherein the subcomponent is an as-required part.

4. The method of claim 1, wherein the flag is generated in response to the subcomponent requiring at least one of polishing or machining.

5. The method of claim 1, wherein flagging of the BOM issue is based on input from another user.

6. The method of claim 1, wherein the guidance is based on input of another user.

7. The method of claim 1, wherein the flag is generated in response to a description of the subcomponent.

8. The method of claim 1, wherein the flag is generated in response to a part number of the subcomponent.

9. The method of claim 1, further comprising:
determining, by operation of the computer processor, that visual BOM verification is required for the subcomponent, and in response presenting a visual representation of the BOM via a second graphical user interface;
receiving an indication, via the second graphical interface, that visual BOM verification is complete.

10. A system, comprising:
an integrated tool analysis server, the integrated tool analysis server comprising:
  a central processing unit; and
  a memory operatively coupled to the central processing unit and storing an integrated part analysis tool thereon, the integrated part analysis tool adapted to:
    receive a query for a subcomponent of a complex component;
    determine, by operation of a computer processor, that the subcomponent is one of: a make-from part and an as-required part;
    in response to receiving the query, retrieve, by operation of the computer processor using a search engine, physical specifications for the subcomponent;
    present to a user, via a graphical user interface, a flag indicating a Bill of Materials (BOM) issue exists for the subcomponent, the flag indicating that the subcomponent is one of: a make-from part and an as-required part;
    provide guidance to the user to complete at least one of a weight or balance calculation relating to the subcomponent;
    receive user input, the user input including at least one of a calculated weight and balance data;
    validate the calculated weight or balance data using a filter program, the validation comprising:
      determining that that the calculated weight or balance data is a valid data type; and
      identifying database access privileges for the user and determining that the user has sufficient database access privileges to save data to a database;
    transfer, by operation of the computer processor and based on validating the calculated weight or balance data, including determining that the user has sufficient database access privileges to save data to the database, the calculated weight or balance data to the database;
    compute an error value by comparing the calculated weight or balance data with measured weight or balance data relating to the subcomponent; and
    identify an issue with a manufacturing process, for correction, based on determining that the error value falls outside a pre-determined margin of error, and in response providing an indication of the issue with the manufacturing process.

11. The system of claim 8, wherein the subcomponent is a make-from part.

12. The system of claim 8, wherein the flag is generated in response to the subcomponent requiring polishing or machining.

13. The system of claim 8, wherein flagging of the BOM issue is based on input from another user.

14. The system of claim 8, wherein the guidance is based on input of another user.

15. The system of claim 8, wherein the flag is generated in response to a description of the subcomponent.

16. A computer program product for determining weight or center of gravity of a component, the computer program product comprising:
a non-transitory computer-readable storage medium having computer-readable program code embodied therewith, the computer-readable program code executable by one or more computer processors to:
  receive a query for a subcomponent of a complex component;
  determine, by operation of a computer processor, that the subcomponent is one of: a make-from part and an as-required part;
  in response to receiving the query, retrieve, by operation of the computer processor using a search engine, physical specifications for the subcomponent;
  present to a user, via a graphical user interface, a flag indicating a Bill of Materials (BOM) issue exists for the subcomponent, the flag indicating that the subcomponent is one of: a make-from part and an as-required part;
provide guidance to the user to complete at least one of a weight or balance calculation relating to the subcomponent;
receive user input, the user input including at least one of a calculated weight and balance data;
validate the calculated weight or balance data using a filter program, the validation comprising:
 determining that that the calculated weight or balance data is a valid data type; and
 identifying database access privileges for the user and determining that the user has sufficient database access privileges to save data to a database;
transfer, by operation of the computer processor and based on validating the calculated weight or balance data, including determining that the user has sufficient database access privileges to save data to the database, the calculated weight or balance data to the database;

compute an error value by comparing the calculated weight or balance data with measured weight or balance data relating to the subcomponent; and
identify an issue with a manufacturing process, for correction, based on determining that the error value falls outside a pre-determined margin of error, and in response providing an indication of the issue with the manufacturing process.

17. The computer program product of claim 16, wherein the flag is generated in response to a part number of the subcomponent.

18. The computer program product of claim 16, wherein the flag is generated in response to a description of the subcomponent.

19. The computer program product of claim 16, wherein flagging of the BOM issue is based on input from another user.

20. The computer program product of claim 16, wherein the flag is generated in response to the subcomponent requiring at least one of polishing or machining.

\* \* \* \* \*

UNITED STATES PATENT AND TRADEMARK OFFICE
CERTIFICATE OF CORRECTION

PATENT NO. : 10,317,271 B2  
APPLICATION NO. : 14/689213  
DATED : June 11, 2019  
INVENTOR(S) : Scott Preston Sheriff et al.

Page 1 of 1

It is certified that error appears in the above-identified patent and that said Letters Patent is hereby corrected as shown below:

In the Claims

In Column 19, Line 19, in Claim 1, delete "that that" and insert -- that --, therefor.

In Column 20, Line 20, in Claim 10, delete "that that" and insert -- that --, therefor.

In Column 20, Line 40, in Claim 11, delete "claim 8," and insert -- claim 10, --, therefor.

In Column 20, Line 42, in Claim 12, delete "claim 8," and insert -- claim 10, --, therefor.

In Column 20, Line 45, in Claim 13, delete "claim 8," and insert -- claim 10, --, therefor.

In Column 20, Line 47, in Claim 14, delete "claim 8," and insert -- claim 10, --, therefor.

In Column 20, Line 49, in Claim 15, delete "claim 8," and insert -- claim 10, --, therefor.

In Column 21, Line 12, in Claim 16, delete "that that" and insert -- that --, therefor.

Signed and Sealed this  
Third Day of September, 2019

Andrei Iancu  
*Director of the United States Patent and Trademark Office*